(12) United States Patent
Karczewicz et al.

(10) Patent No.: US 8,331,444 B2
(45) Date of Patent: Dec. 11, 2012

(54) SUB-BAND SCANNING TECHNIQUES FOR ENTROPY CODING OF SUB-BANDS

(75) Inventors: Marta Karczewicz, San Diego, CA (US); Hyukjune Chung, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1050 days.

(21) Appl. No.: 12/144,454

(22) Filed: Jun. 23, 2008

(65) Prior Publication Data

US 2009/0003440 A1 Jan. 1, 2009

Related U.S. Application Data

(60) Provisional application No. 60/946,358, filed on Jun. 26, 2007.

(51) Int. Cl.
*H04N 7/12* (2006.01)
(52) U.S. Cl. .............................. 375/240.11; 375/240.16
(58) Field of Classification Search ............. 375/240.11, 375/240.16
See application file for complete search history.

(56) References Cited

U.S. PATENT DOCUMENTS

| | | | |
|---|---|---|---|
| 5,657,085 A | 8/1997 | Katto | |
| 5,949,912 A | 9/1999 | Wu | |
| 6,891,974 B1 | 5/2005 | Malvar et al. | |
| 2002/0150164 A1* | 10/2002 | Felts et al. | 375/240.19 |
| 2003/0202582 A1* | 10/2003 | Satoh | 375/240.03 |
| 2004/0021587 A1* | 2/2004 | Hashirano | 341/50 |
| 2005/0232353 A1* | 10/2005 | Bourge et al. | 375/240.16 |
| 2006/0008038 A1* | 1/2006 | Song et al. | 375/350 |
| 2006/0114998 A1* | 6/2006 | Barrau | 375/240.19 |
| 2008/0273814 A1* | 11/2008 | Mitchell et al. | 382/298 |
| 2009/0060358 A1* | 3/2009 | Mitchell et al. | 382/235 |
| 2009/0274378 A1* | 11/2009 | Fukuhara et al. | 382/232 |
| 2010/0008428 A1* | 1/2010 | Gordon | 375/240.23 |

FOREIGN PATENT DOCUMENTS

| | | |
|---|---|---|
| EP | 0817494 A2 | 1/1998 |
| JP | 4326886 A | 11/1992 |
| JP | 8186816 A | 7/1996 |
| JP | 2001218209 A | 8/2001 |
| KR | 20070043638 A | 4/2007 |

(Continued)

OTHER PUBLICATIONS

Andreopoulos, et al: "Spatio-temporal-snr scalable wavelet coding with motion compensated dct base-layer architectures," Proceedings 2003 Intl Conference on Image Processing, Sep. 14-17, 2003, IEEE vol. 2, Sep. 14, 2003, pp. 795-798, ISBN: 978-0-7803-7750-9.

(Continued)

*Primary Examiner* — Andrew Lee
(74) *Attorney, Agent, or Firm* — Brent Boyd

(57) ABSTRACT

This disclosure describes techniques useful in the encoding and/or decoding of video data of a video sequence. In general, this disclosure sets forth scanning techniques useful in the context of sub-band coding, which may improve the level of compression that can be achieved by entropy coding following sub-band coding. In one example, a method of encoding video data of a video sequence comprises sub-band encoding the video data to generate a plurality of sub-bands, scanning each of the sub-bands from two-dimensional blocks into one-dimensional vectors based on scan orders defined for each of the sub-bands, and entropy encoding each of the scanned sub-bands.

68 Claims, 12 Drawing Sheets

FOREIGN PATENT DOCUMENTS

WO     WO2007046644     4/2007

OTHER PUBLICATIONS

International Search Report/Written Opinion—PCT/US08/068241—International Search Authority EPO—Jan. 13, 2009.

Lee, et al: "Subband video coding with temporarily adaptive motion interpolation," Proceeding OT EH Intl Conference on Acoustics, Speech, and Signal Processing, Apr. 19-22, 1994, vol. v, pp. v/497-v/500, ISBN: 978-0-7803-7-1775-8.

Xiaopeng, et al., "A novel coefficient scanning scheme for directional spatial prediction-based image compression", Multimedia and EXPO, 2003. Proceedings. 2003 International Conference on Jul. 6-9, 2003, Piscataway, NJ, vol. 2, pp. 557-560, XP010650616.

Lopez, et al., "Fully Scalable Video Coding with Packed Stream", Computer Architect and Electronics Dept., University of Almeria, Spain, pp. 1-12, Sep. 2007.

Jin, et al., "H.264-Compatible Spatially Scalable Video Coding with In-Band Prediction", Dept. of Electronics & Inf., Huazhong University of Sci. & Technol., Wuhan China, pp. 1-4, Sep. 2005.

JPEG2000 image compression technology, JPEG (Joint Photographic Experts Group), http://web.ydu.edu.tw/~hjw/course/media/JPEG2000.pdf.

Taiwan Search Report—TW097123950—TIPO—Dec. 6, 2011.

* cited by examiner

SCAN ORDER FOR LL

| 1 | 2 | 6 | 7 |
|---|---|---|---|
| 3 | 5 | 8 | 13 |
| 4 | 9 | 12 | 14 |
| 10 | 11 | 15 | 16 |

FIG. 6A

SCAN ORDER FOR LH

| 8 | 4 | 2 | 1 |
|---|---|---|---|
| 13 | 10 | 6 | 3 |
| 15 | 12 | 9 | 5 |
| 16 | 14 | 11 | 7 |

FIG. 6B

SCAN ORDER FOR HL

| 7 | 13 | 15 | 16 |
|---|---|---|---|
| 4 | 8 | 12 | 14 |
| 2 | 5 | 9 | 11 |
| 1 | 3 | 6 | 10 |

FIG. 6C

SCAN ORDER FOR HH

| 16 | 14 | 11 | 8 |
|---|---|---|---|
| 15 | 12 | 7 | 5 |
| 13 | 9 | 4 | 2 |
| 10 | 6 | 3 | 1 |

FIG. 6D

SUB-BAND SCANNING TECHNIQUES FOR ENTROPY CODING OF SUB-BANDS

This application claims the benefit U.S. Provisional Application 60/946,358, filed on Jun. 26, 2007, the entire content of which is incorporated herein by reference.

TECHNICAL FIELD

This disclosure relates to video coding used to compress video data and, more particularly, scanning techniques used during entropy coding of video data.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

Block-based video compression techniques generally perform spatial prediction and/or temporal prediction. Intra-coding commonly relies on spatial prediction to reduce or remove spatial redundancy between video blocks within a given coded unit, which may comprise a video frame, a slice of a video frame, or any independently decodable unit. In contrast, inter-coding relies on temporal prediction to reduce or remove temporal redundancy between video blocks of temporally successive coded units of a video sequence. For intra-coding, a video encoder may perform spatial prediction to compress data based on other data within the same coded unit. For inter-coding, the video encoder may perform motion estimation and motion compensation to track the movement of corresponding video blocks of two or more adjacent coded units.

A coded video block may be represented by prediction information that comprises a prediction mode and a predictive block size, and a residual block of data indicative of differences between the block being coded and a predictive block. In the case of inter-coding, one or more motion vectors are used to identify the predictive block of data. For intra-coding, the prediction mode can be used to generate the predictive block.

After block-based prediction coding, the video encoder may apply transform, quantization and entropy coding processes to further reduce the bit rate associated with communication of a residual block. Transform techniques may comprise discrete cosine transforms or conceptually similar processes, integer transforms, or other types of transforms. In a discrete cosine transform (DCT) process, as an example, the transform process converts a set of pixel values into transform coefficients, which may represent the energy of the pixel values in the frequency domain.

Quantization is applied to the transform coefficients, and generally involves a process that limits the number of bits associated with any given transform coefficient. Entropy coding comprises one or more processes that collectively compress a sequence of quantized transform coefficients. Scanning techniques, such as zig-zag scanning techniques, may be performed on the quantized transform coefficients in order to define one-dimensional vectors of coefficients from two-dimensional blocks. The scanned coefficients are then entropy coded, e.g., via content adaptive variable length coding (CAVLC), context adaptive binary arithmetic coding (CABAC), or another entropy coding process.

In many cases, a video sequence may be coded into a base layer and one or more enhancement layers. In this case, the base layer may define a base level of video quality, and one or more enhancement layers may enhance the quality of the decoded video signal. Enhancement layers may improve the video quality in a variety of ways, e.g., by providing spatial or signal-to-noise enhancements to base layer frames, or by providing temporal enhancements to the decoded video by adding additional frames between the base layer frames. In any case, the encoded video may be transmitted to a video decoding device, which performs the reciprocal process of the video encoder in order to reconstruct the video sequence.

SUMMARY

This disclosure describes techniques useful in the encoding and/or decoding of video data of a video sequence. In general, this disclosure sets forth scanning techniques useful in the context of sub-band coding. The described scanning techniques may improve the level of compression that can be achieved by entropy coding following sub-band coding. Such scanning techniques may be used in many different contexts, e.g., any time entropy encoding follows sub-band encoding in the encoding process and any time sub-band decoding follows entropy decoding in the decoding process. In addition, this disclosure sets forth a complete encoding and decoding process, which may be particularly useful for intra coding video blocks, and may provide a mechanism for defining base and enhancement layers to achieve scalability in the coding process.

In one example, this disclosure provides a method of encoding video data of a video sequence, the method comprising sub-band encoding the video data to generate a plurality of sub-bands, scanning each of the sub-bands from two-dimensional blocks into one-dimensional vectors based on scan orders defined for each of the sub-bands, and entropy encoding each of the scanned sub-bands.

In another example, this disclosure provides a method of decoding video data of a video sequence, the method comprising entropy decoding each of a plurality of sub-bands that correspond to the video data, scanning each of the sub-bands from one-dimensional vectors to two-dimensional blocks based on scan orders defined for each of the sub-bands, and sub-band decoding the plurality of sub-bands to generate the video data.

In another example, this disclosure provides an apparatus that encodes video data of a video sequence, the apparatus comprising a sub-band coding unit that encodes the video data to generate a plurality of sub-bands, a scanning unit that scans each of the sub-bands from two-dimensional blocks into one-dimensional vectors based on scan orders defined for each of the sub-bands, and an entropy coding unit that entropy encodes each of the scanned sub-bands.

In another example, this disclosure provides an apparatus that decodes video data of a video sequence, the apparatus comprising an entropy coding unit that entropy decodes each of a plurality of sub-bands that correspond to the video data, a scanning unit that scans each of the sub-bands from one-dimensional vectors to two-dimensional blocks based on scan orders defined for each of the sub-bands, and a sub-band coding unit that sub-band decodes the plurality of sub-bands to generate the video data.

In another example, this disclosure provides a device that encodes video data of a video sequence, the device comprising means for sub-band encoding the video data to generate a plurality of sub-bands, means for scanning each of the sub-bands from two-dimensional blocks into one-dimensional vectors based on scan orders defined for each of the sub-bands, and means for entropy encoding each of the scanned sub-bands.

In another example, this disclosure provides a device for decoding video data of a video sequence, the device comprising means for entropy decoding each of a plurality of sub-bands that correspond to the video data, means for scanning each of the sub-bands from one-dimensional vectors to two-dimensional blocks based on scan orders defined for each of the sub-bands, and means for sub-band decoding the plurality of sub-bands to generate the video data.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to encode video data of a video sequence, wherein the instructions cause the device to sub-band encode the video data to generate a plurality of sub-bands, scan each of the sub-bands from two-dimensional blocks into one-dimensional vectors based on scan orders defined for each of the sub-bands, and entropy encode each of the scanned sub-bands.

In addition, this disclosure also contemplates a computer-readable medium comprising instructions that upon execution in a video coding device cause the device to decode video data of a video sequence, wherein the instructions cause the device to entropy decode each of a plurality of sub-bands that correspond to the video data, scan each of the sub-bands from one-dimensional vectors to two-dimensional blocks based on scan orders defined for each of the sub-bands, and sub-band decode the plurality of sub-bands to generate the video data.

In still another example, this disclosure provides a device that encodes video data of a video sequence, the device comprising a sub-band coding unit that encodes the video data to generate a plurality of sub-bands, a scanning unit that scans each of the sub-bands from two-dimensional blocks into one-dimensional vectors based on scan orders defined for each of the sub-bands, an entropy coding unit that entropy encodes each of the scanned sub-bands to generate at least a portion of a bitstream, and a wireless transmitter that sends the bitstream to another device.

In yet another example, this disclosure provides a device that decodes video data of a video sequence, the apparatus comprising a wireless receiver that receives a bitstream comprising a plurality of entropy coded sub-bands corresponding to the video data, an entropy coding unit that entropy decodes each of the plurality of sub-bands, a scanning unit that scans each of the sub-bands from one-dimensional vectors to two-dimensional blocks based on scan orders defined for each of the sub-bands, and a sub-band coding unit that sub-band decodes the plurality of sub-bands to generate the video data.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 6A-6D illustrate exemplary scanning orders for different sub-bands.

DETAILED DESCRIPTION

Figure 1:
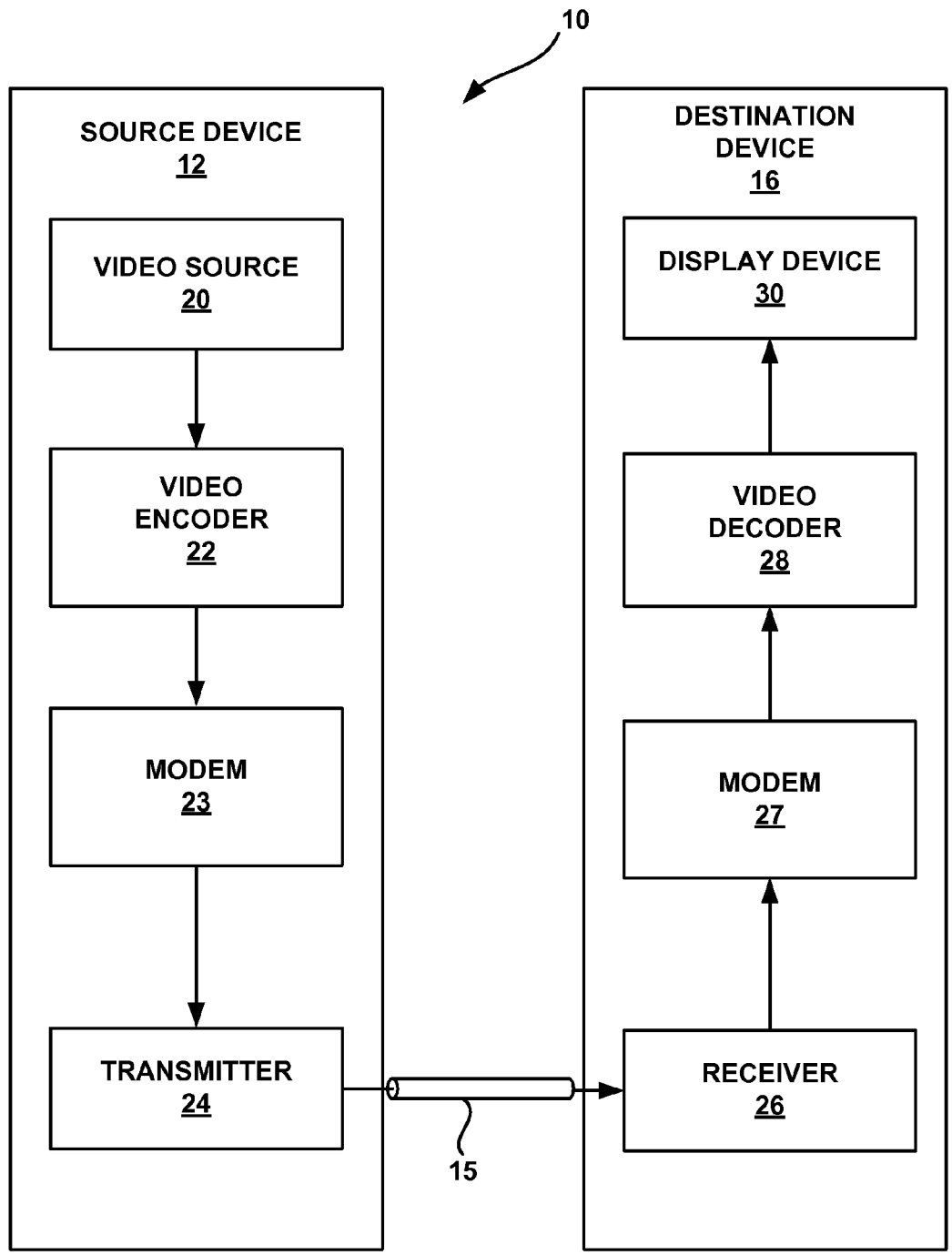
FIG. 1 is an exemplary block diagram illustrating a video encoding and decoding system.

This disclosure describes techniques useful in the encoding and/or decoding of video data of a video sequence. In general, this disclosure sets forth scanning techniques useful in the context of sub-band coding. The described scanning techniques may improve the level of compression that can be achieved by entropy coding following sub-band coding. Such scanning techniques may be used in many different contexts, e.g., any time entropy encoding follows sub-band encoding in the encoding process and any time sub-band decoding follows entropy decoding in the decoding process. In addition, this disclosure sets forth complete encoding and decoding processes, which may be particularly useful for intra coding video blocks, and may provide a mechanism for defining base and enhancement layers to achieve scalability in the coding process.

Sub-band coding refers to a process in which a block of data is transformed into a plurality of sub-bands. Typically, sub-band coding involves filtering and downsampling by the encoder. For example, a block of video data may be filtered by high pass and low pass filters, and downsampled following each filtering step. In two-dimensional sub-band coding, a block of video data may be transformed into four sub-bands comprising a low-low (LL) sub-band, a low-high (LH) sub-band, a high-low (HL) sub-band, and a high-high (HH) sub-band. The LL sub-band is essentially a downsampled version of the original video block, while the LH, HL, and HH sub-bands define the information lost in the down sampling of the LL sub-band, e.g., in the horizontal, vertical and diagonal dimensions. If additional sub-band coding is used (e.g., three-dimensional sub-band coding), the same sub-band coding process may applied again with respect to the LL sub-band. This process may be repeated many times for any dimension of sub-band coding. Additional details of sub-band coding are discussed in greater detail below.

In some aspects, this disclosure sets forth scanning techniques useful in the context of sub-band coding, which may improve the level of compression that can be achieved by entropy coding following sub-band coding. Such scanning techniques, however, may be used in many other contexts, e.g., any time entropy encoding follows sub-band encoding in the encoding process and any time sub-band decoding follows entropy decoding in the decoding process. In general, this disclosure proposes the use of different scanning orders for the LL sub-band, the LH sub-band, the HL sub-band, and the HH sub-band. The scanning converts two-dimensional blocks of data into one-dimensional vectors, which can then be entropy coded. By defining different scanning orders for the different sub-bands, high energy sub-band coefficients can be grouped together and low energy sub-band coefficients can be grouped together, thereby promoting efficient entropy coding. The scanning techniques may be fixed or adaptive for each of the sub-bands.

In addition, this disclosure also sets forth complete encoding and decoding processes, which may be particularly useful for intra coding of video blocks. The described encoding and decoding process may also provide a mechanism for defining base and enhancement layers to achieve scalability in the coding process. Basically, the encoding process includes sub-band coding, followed by predictive coding of each of the sub-bands in the sub-band domain. The predictive coding may comprise intra prediction similar to that set forth in ITU H.264, but applied in the sub-band domain, rather than a normal pixel domain. Other types of intra prediction, or possibly inter-prediction may also be used in accordance with this disclosure.

Following prediction in the sub-band domain, the residual sub-bands may be transformed via discrete cosine transform (DCT) or a conceptually similar process, and then quantized. Scanning and entropy coding can then be applied on the quantized and transformed sub-bands, e.g., implementing the scanning techniques of this disclosure, which provide different scanning orders for each of the sub-bands.

The intra coded data may be denoted as a base layer corresponding to the coded LL sub-band, and one or more enhancement layers corresponding to the other sub-bands. Furthermore, this disclosure also recognizes that the DCT transform step may be avoided for the HH sub-band insofar as DCT may not compress the HH sub-band. The decoding process performs the inverse operations to those of the encoding process in order to reconstruct the original video data.

FIG. 1 is a block diagram illustrating an exemplary video encoding and decoding system 10 that may implement one or more of the techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication device handsets, such as so-called cellular or satellite radiotelephones. The techniques of this disclosure, however, which apply more generally to video encoding and decoding, are not necessarily limited to wireless applications or settings.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to perform the encoding techniques of this disclosure. Similarly, video decoder 28 of destination device 16 may be configured to perform the decoding techniques of this disclosure. Again, the illustrated system 10 of FIG. 1 is merely one exemplary system in which the techniques of this disclosure may be used.

In accordance with this disclosure, video encoder 22 encodes video data of a video sequence. In particular, video encoder 22 may encode the video data to generate a plurality of sub-bands, scan each of the sub-bands from two-dimensional blocks into one-dimensional vectors based on scan orders defined for each of the sub-bands, and entropy encode each of the scanned sub-bands. In some cases, following the sub-band coding and prior to scanning and entropy coding, video encoder 22 may predictively encode the sub-bands to generate residuals for the sub-bands, transform the residuals, and quantize the transform coefficients associated with the residuals.

On the decoder side, video decoder 28 may decode video data of a video sequence. In particular, video decoder 28 may decode each of a plurality of sub-bands that correspond to the video data, scan each of the sub-bands from one-dimensional vectors to two-dimensional blocks based on scan orders defined for each of the sub-bands, and sub-band decode the plurality of sub-bands to generate the video data. In some cases, following the scanning and entropy coding and prior to the sub-band coding, video encoder 28 may inverse quantize, inverse transform, and predictively decode the sub-bands.

In general, source device 12 generates coded video data for transmission to destination device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony. Devices consistent with this disclosure could also capture, encodes, archive, and decode video data for playback, e.g., without communicating encoded video to other devices.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication technique, e.g., such as code division multiple access (CDMA) or another communication technique or standard, and transmitted to destination device 16 via transmitter 24.

Receiver 26 of destination device 16 receives information over channel 15, and modem 27 demodulates the information. The video decoding process performed by video decoder 28 may perform entropy decoding, scanning, and sub-band decoding as part of the reconstruction of the video sequence. Display device 28 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

The entropy coding performed by video encoder 22 and video decoder 28 may operate according to content adaptive variable length coding (CAVLC), context adaptive binary arithmetic coding (CABAC), or another entropy coding methodology. Furthermore, the techniques may be readily configured to comply with one or more video compression standards, such as those defined by the Moving Picture Experts Group (MPEG) in MPEG-1, MPEG-2 and MPEG-4, the ITU-T H.263 standard, ITU-T H.264 standard, H.264/MPEG-4, Part 10, Advanced Video Coding (AVC), the Society of Motion Picture and Television Engineers (SMPTE) 421M video CODEC standard (commonly referred to as "VC-1"), the standard defined by the Audio Video Coding Standard Workgroup of China (commonly referred to as "AVS"), as well as any other video coding standard defined by a standards body or developed by an organization as a proprietary or non-proprietary standard.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. Furthermore, video encoder 22 and video decoder 28 each may be implemented in software, in which case, video encoder 22 and video decoder 28 may comprise computer-executable instructions, executed by one or more processors of devices 12 and 16 in order to carry out the techniques described herein.

A video sequence includes a series of video frames, which include video blocks and possibly coded units such as slices of video blocks. In some cases, a video sequence can be arranged as a group of pictures (GOP). Video encoder 22 operates on video blocks within individual video frames in order to encode the video data. The techniques of this disclosure provide coding techniques that can be applied to video data comprising a video block. In some cases, the techniques may be applied to some video blocks (such as intra blocks), while other types of techniques are used for other types of video blocks (such as inter blocks).

The video blocks may have fixed or varying sizes, and may differ in size according to a specified coding standard. Each video frame may include a series of slices, and in some cases, slices may themselves define independently decodable units. Each slice may include a series of video blocks such as macroblocks, which may be arranged into even smaller video blocks. Macroblocks typically refer to 16 by 16 video blocks of data. The ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

In this disclosure, the term "video block" may generally refer to any size block of video data. Moreover, video blocks may be defined in several different domains, such as the pixel domain, the sub-band domain, a DCT transformed domain, and so forth. Larger video blocks, such as macroblocks, may be divided into smaller sized video blocks. Smaller video blocks can provide better resolution, and may be used for locations of a video frame that include high levels of detail. In the discussion below, sub-band coding is two-dimensional and creates four 4 by 4 element sub-bands from an 8 by 8 element video block. The techniques, however, are not limited to two-dimensional sub-band coding or any specific video block size or sub-band size.

Figure 2:
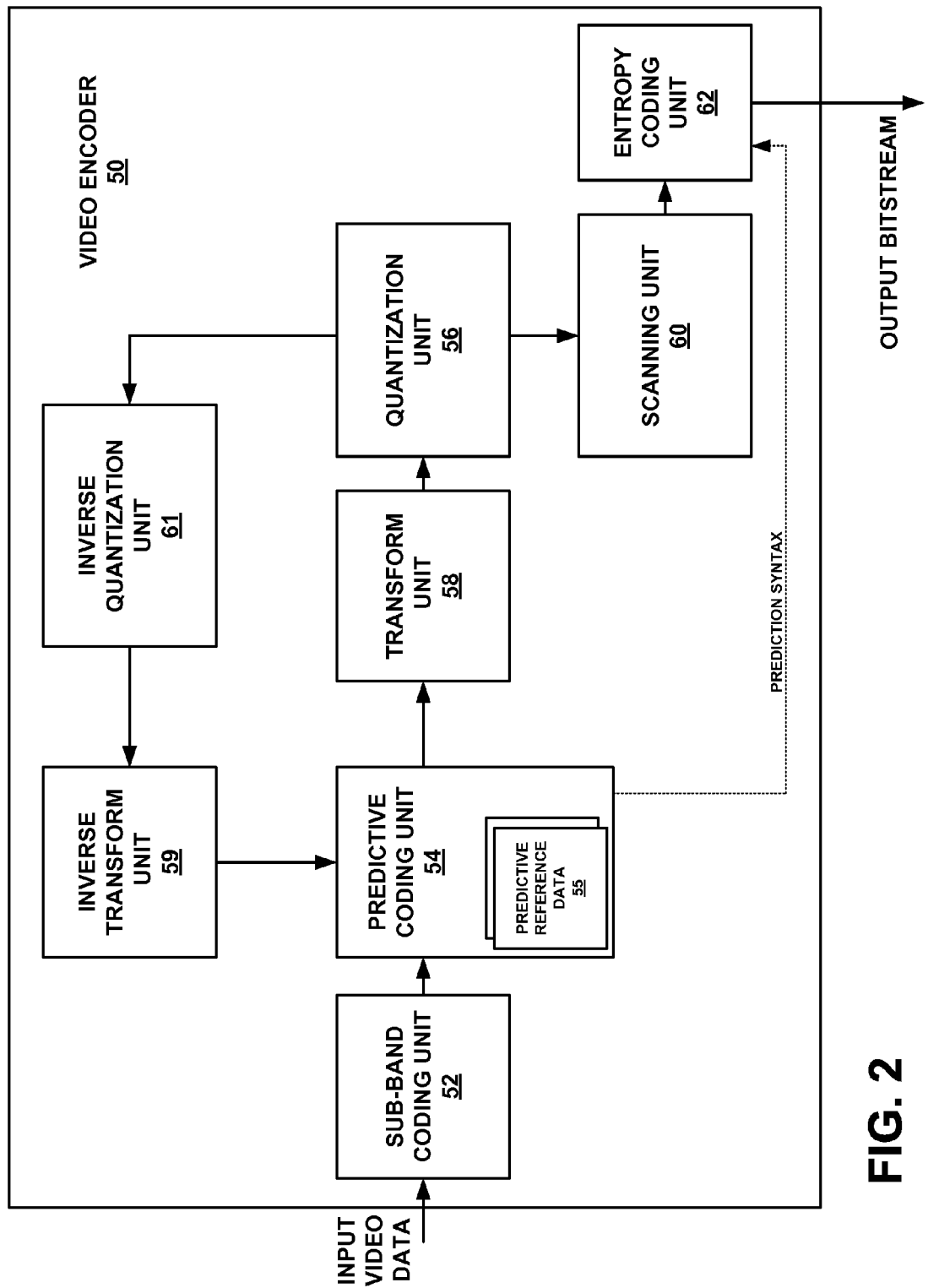
FIG. 2 is a block diagram illustrating an example of a video encoder consistent with this disclosure.

FIG. 2 is a block diagram illustrating an example of a video encoder 50, which may correspond to video encoder 22 or may comprise a portion of video encoder 22. Video encoder 50 may be particularly useful as an intra coder for intra coding video blocks based on spatial similarities within a coded unit. As shown in FIG. 2, video encoder 50 receives input video data, which may comprise a video block to be intra coded.

Video encoder 50 includes a sub-band coding unit 52. Sub-band coding unit 52 sub-band encodes the input video data to generate a plurality of sub-bands. For example, sub-band coding unit 52 may filter and downsample the video data to generate the plurality of sub-bands. In the case of two-dimensional sub-band coding, the sub-bands comprise a low-low (LL) sub-band, a low-high (LH) sub-band, a high-low (HL) sub-band, and a high-high (HH) sub-band. For three-dimensional sub-band coding, the LL sub-band is itself used to generate four sub-sub-bands. For four-dimensional sub-band coding, the LL sub-sub-band created from the LL sub-band is again used to generate four more sub-sub-sub-bands.

Figure 3:
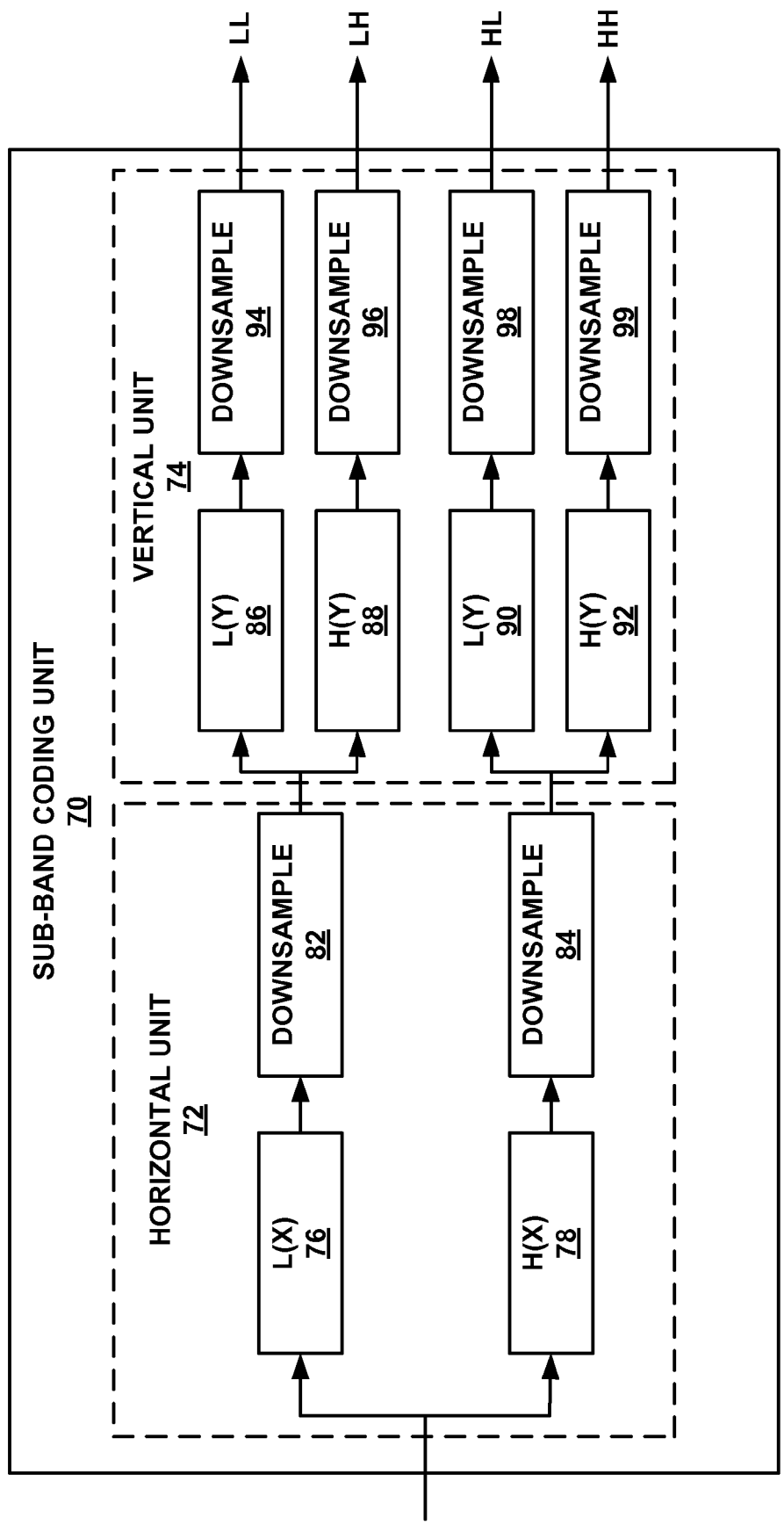
FIG. 3 is a block diagram illustrating an example of a sub-band coding unit consistent with this disclosure.

This disclosure can apply to any dimension of sub-band coding. In any case, the generated plurality of sub-bands comprises a set of sub-bands that collectively represent the video block. FIG. 3, discussed in greater detail below, provides additional details of an exemplary sub-band coding unit. For illustrative purposes, this disclosure describes two-dimensional sub-band coding in which a video block is sub-band coded into the LL, LH, HL and HH sub-bands.

Predictive coding unit 54 receives the LL, LH, HL and HH sub-bands and performs predictive coding with respect to each of the sub-bands. The predictive coding may comprise inter or intra predictive techniques, e.g., temporal or spatial prediction. However, for purposes of illustration, predictive coding unit 54 may be assumed to perform intra prediction. In this case, the intra prediction may comprise prediction that is based on data within the same coded unit and within the sub-band domain, e.g., in a manner that is similar to H.264 intra prediction. Conventional H.264 intra prediction, however, occurs in the pixel domain, while the H.264-like intra prediction techniques of this disclosure may occur in the sub-band domain. Other types of intra prediction (e.g., intra prediction similar to that of H.263 or another standard) could also be used.

In H.264, intra coding modes may comprise modes such as vertical, horizontal, DC, diagonal downleft, diagonal downright, vertical right, horizontal down, vertical left and horizontal up. Each of these different modes defines the way in which predictive blocks are generated based on neighboring data within the same coded unit. Intra coding modes may also define combinations of the modes mentioned above, such as vertical plus horizontal, DC plus vertical, DC plus horizontal, diagonal downleft plus horizontal, diagonal downright plus vertical, vertical right plus horizontal, horizontal down plus vertical, vertical left plus horizontal and horizontal up plus vertical.

Additional details of several H.264-compliant modes are set forth in the following document, which is incorporated herein by reference: Y. Ye and M. Karczewicz, "Improved Intra Coding," ITU-T Q.6/SG16 VCEG, C257, Geneva, Switzerland, June 2007. In any case, this disclosure is not limited to any particular number of modes, or types of modes. Moreover, unlike the modes described in the document referenced above, predictive coding unit 54 operates in the sub-band domain, e.g., comparing the data of a sub-band to predictive sub-bands generated by predictive coding unit 54 using techniques similar to those of intra H.264 prediction, but doing so in the sub-band domain rather than a conventional pixel domain. Basically, a predictive mode may define the way in which the data of the predictive sub-band block of data is located or generated. Predictive coding unit 54 subtracts the current sub-band block of data from the generated predictive sub-band block in order to generate residual data associated with that sub-band. The sub-bands may also be reconstructed and stored as predictive reference data 55.

Transform unit 58 applies DCT or a conceptually similar transform on the sub-bands, which at this point are represented by residual blocks of data. Quantization unit 56 then quantizes the sub-bands, which following the transform process may be represented by transform coefficients. Prediction syntax (e.g., indicative of the manner in which the predictive block is generated by predictive coding unit 54) is forwarded from predictive coding unit 54 to entropy coding unit 62 for inclusion in the encoded bitstream. Inverse quantization unit 61 and inverse transform unit 59 reconstruct the coded sub-bands so that this reconstructed data can be added back to the predictive sub-band data that was used in the coding. Predictive reference data 55 can be stored and used coding the current sub-bands or possibly subsequent sub-bands if temporal predictive coding is used. In short, predictive coding unit 54 generates output that comprises residual sub-band data. In addition, predictive coding unit 54 receives a reconstructed version of the residual sub-band data from inverse transform unit 59 and combines reconstructed version of the residual sub-band data with the predictive sub-band data that was used by predictive coding unit 54 for predictively encoding the residual. In this way, predictive reference data 55 is reconstructed and stored for use in current or subsequent prediction in the sub-band domain.

In accordance with this disclosure, scanning unit 60 applies different scanning orders for scanning each of the sub-bands from two-dimensional blocks of data to one-dimensional vectors. Again, at this point in the coding process, the sub-bands may comprise residual blocks of data that are transformed into a frequency domain. This disclosure recognizes that the LL, LH, HL and HH sub-bands typically define high energy elements at different locations within the two-dimensional blocks of data. By defining different scanning orders for the LL, LH, HL and HH sub-bands, the scanning can more readily promote efficient entropy coding. The scanning orders may be defined differently for the LL, LH, HL and HH sub-bands. Moreover, in some cases, the scanning orders for the LL, LH, HL and HH sub-bands may adapt over time based on statistics associated with the data in each sub-band. In this way, scanning unit 60 can scan two-dimensional blocks (e.g., sub-bands in residual and transformed format) into one-dimensional vectors in a way that allows for improved compression by entropy coding unit 62.

Entropy coding unit 62 entropy encodes the one-dimensional vectors of data corresponding to the LL, LH, HL and HH sub-bands along with syntax such as the prediction syntax from prediction coding unit 54 according to an entropy coding methodology. The entropy coding may conform to content adaptive variable length coding (CAVLC), context adaptive binary arithmetic coding (CABAC), or another entropy coding methodology. Entropy coding unit 62 outputs the encoded bitstream, which may then be transmitted to another device.

CAVLC is one type of entropy coding technique supported by the ITU H.264/MPEG4, AVC standard. CAVLC uses variable length coding (VLC) tables in a manner that effectively compresses serialized "runs" of transform coefficients. CABAC is another type of entropy coding technique supported by the ITU H.264/MPEG4, AVC standard. CABAC may involve several stages, including binarization, context model selection, and binary arithmetic coding. Many other types of entropy coding techniques also exist, and new entropy coding techniques will likely emerge in the future. In any case, the techniques of this disclosure promote effective entropy coding by scanning the LL, LH, HL and HH sub-bands independently according to scan orders specifically defined for the different sub-bands.

In some cases, the HH sub-bands may not be transformed by transform unit 58. In this case, transform unit 58 transforms only a subset of the predictively encoded sub-bands, e.g., the LL sub-band, the LH sub-band and the HL sub-band. DCT or DCT-like transformation may be ineffective for compression of the HH sub-band. In particular, transforms of HH sub-band data to the frequency domain may not compress the HH sub-band. Accordingly, DCT or DCT-like transformation may be avoided for the HH sub-band, but applied to the other sub-bands. In this case, the HH sub-band remains untransformed during the entropy coding.

FIG. 3 is a block diagram illustrating an example of a sub-band coding unit 70 consistent with this disclosure. Sub-band coding unit 70 may correspond to sub-band coding unit 52 of FIG. 2. Sub-band coding unit 70 may be viewed as including a horizontal unit 72 and a vertical unit 74. Sub-band coding unit 70 receives video data in the form of a video block, e.g., an 8 by 8 pixel video block. Horizontal unit 72 filters and downsamples the data in the horizontal dimension, and vertical unit 74 filters and downsamples the data in the vertical dimension. Sub-band LL comprises a version of the original video block downsampled by a factor of 4, e.g., downsampled by 2 in the horizontal and vertical dimensions. Sub-band LH may be viewed as the information of the horizontal dimension that is lost by downsampling, sub-band HL may be viewed as the information of the vertical dimension that is lost by downsampling, and sub-band HH may be viewed as the information of the diagonal dimension that is lost by downsampling.

More specifically, the input video block is received by horizontal unit 72, and horizontal unit 72 applies a low pass filter L(X) 76 and a high pass filter H(X) 78 to the data. Downsample units 82 and 84 downsample the low pass and high pass filtered data by factors of 2. The output of downsample units 82 and 84 passes to vertical unit 74, which applies low-pass filters L(Y) 86 and 90 and high-pass filters H(Y) 88 and 92 to each respective data path. Downsample units 94, 96, 98 and 99 downsample each data path output by filters 86, 88, 90, 82, respectively, by factors of 2. The output of vertical processing unit 74 corresponds to the output of sub-band coding unit 70 and comprises the LL, LH, HL and HH sub-bands, as illustrated in FIG. 3. In some cases, the LL sub-band defines at least a portion of a base layer, while the one or more of the LH sub-band the HL sub-band and the HH sub-band form at least part of one or more enhancement layers. In this way, sub-band coding can be used to facilitate scalable video coding, with the LL sub-band defining a base level of quality and the other sub-bands defining spatial enhancements to the base level of quality defined by the LL sub-band.

Figure 4:
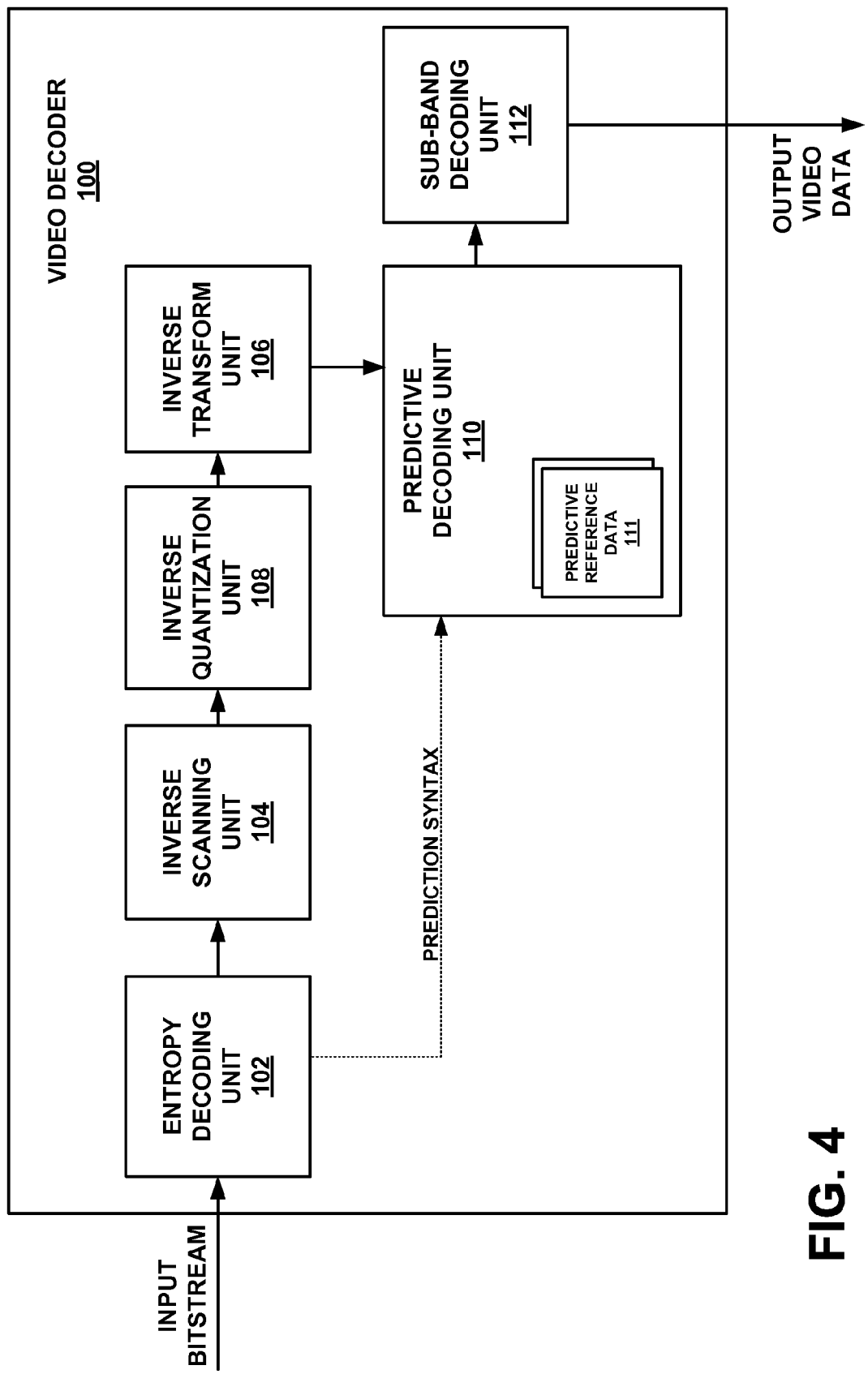
FIG. 4 is a conceptual diagram illustrating an example of a video decoder consistent with this disclosure.

FIG. 4 is a block diagram illustrating an example of a video decoder 100 consistent with this disclosure, which may correspond to video decoder 28. Basically, video decoder 100 performs the reciprocal decoding process to the encoding process performed by encoder 50 of FIG. 2. In this case, video decoder 100 receives an encoded bitstream. Entropy decoder unit 102 applies the reciprocal entropy decoding relative to the entropy encoding performed by entropy encoding unit 62 (FIG. 2). Prediction syntax is forwarded to prediction decoding unit 110 and may comprise the prediction mode to be used for predictive decoding, or any other information used for predictive decoding.

Inverse scanning unit 104 inverse scans the entropy decoded sub-bands using reciprocal scanning techniques relative to those applied by scanning unit 60 (FIG. 2). In this case, inverse scanning unit 104 scans each of the sub-bands from one-dimensional vectors to two-dimensional blocks based on scan orders defined for each of the sub-bands. Again, by defining different scan orders for the LL, LH, HL and HH sub-bands, efficient entropy coding can be promoted. Moreover, the scanning orders (and thus the inverse scanning) for the LL, LH, HL and HH sub-bands may be adaptive, e.g., based on previous coding statistics. This disclosure provides for the use of different scan orders (and inverse scan orders) for each of the LL, LH, HL and HH sub-bands, but should not be considered limiting of the variety of actual scan orders that may be used. Example scan orders are provided below.

Inverse quantization unit 108 performs inverse quantization on the sub-bands. Inverse transform unit 106 then performs inverse transforms, e.g., inverse DCT or inverse DCT-like operations, possibly excluding the inverse transform for the HH sub-band if the HH sub-band was not transformed on the encoder side. The transform methodology may be preset for encoder 50 and for decoder 100 to ensure consistency, or could be communicated in syntax of the transmitted data. Predictive decoding unit 110 uses predictive reference data 111 to generate the prediction data based on the prediction syntax forwarded from entropy decoding unit 102. Predictive decoding unit 110 combines the prediction data with the residual sub-band data in order to generate the sub-bands. Like predictive coding unit 54, predictive decoding unit 110 may implement intra-predictive techniques in the sub-band domain that are similar to ITU H.264 intra prediction modes. In this way, predictive decoding unit 110 can generate the predictive data needed to decode the residuals in the sub-band domain.

Sub-band decoding unit 112 then decodes each of the sub-bands by performing the opposite functions of sub-band encoding unit 52 (FIG. 2). The operations of sub-band decoding unit 112 can be conceptually understood by viewing sub-band coding unit 70 of FIG. 3. For decoding, the signal paths are reversed, the filter taps are inverted, and upsampling is performed rather than down sampling. Thus, for decoding, decoding unit 112 receives the LL, LH, HL and HH subbands and combines these subbands (e.g., according to a reversed signal path to that shown in FIG. 3) in order to generate a video block corresponding to the video data that was originally coded by the encoder.

Figure 5:
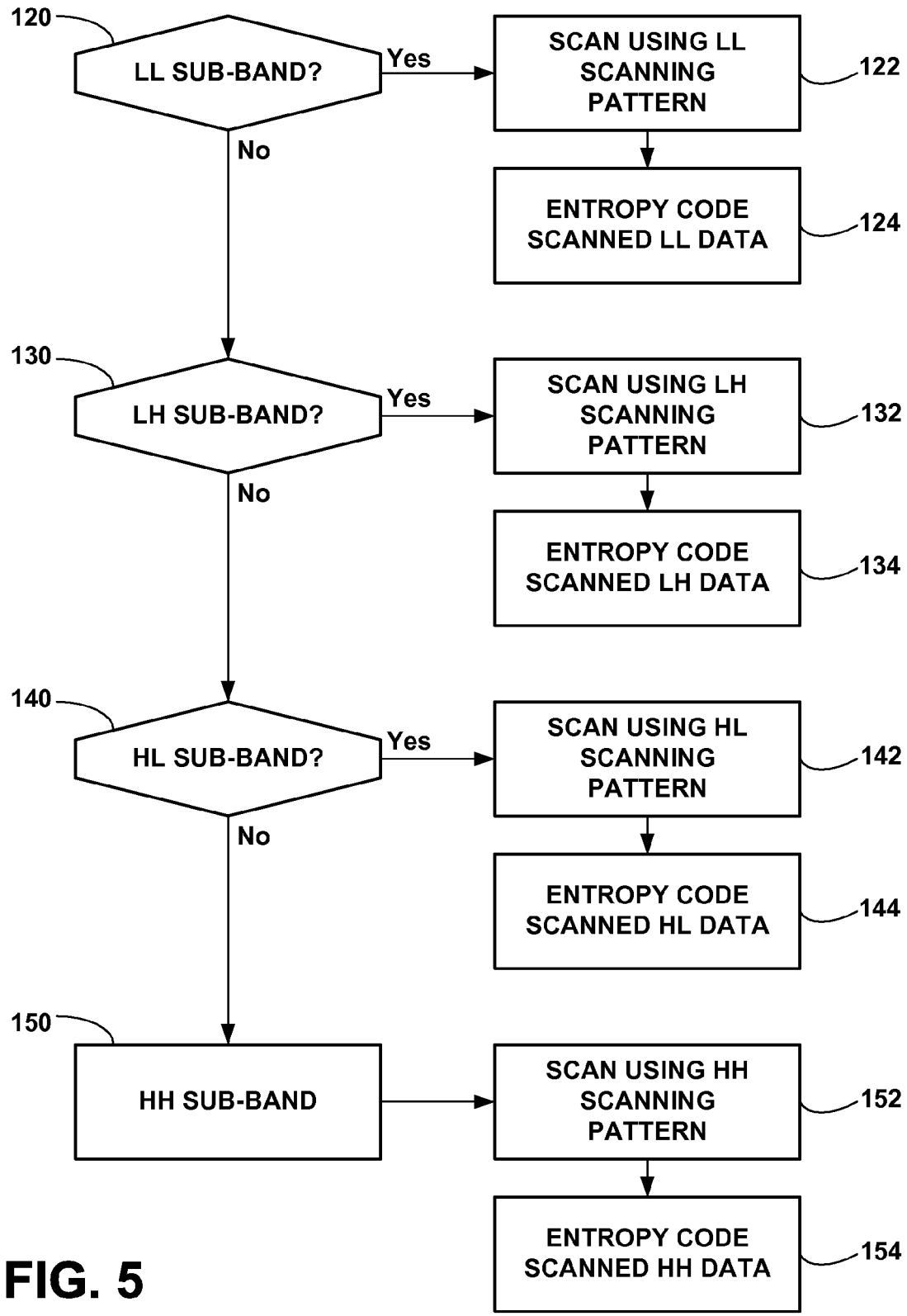
FIG. 5 is a flow diagram illustrating a scanning and entropy coding technique useful in the context of sub-band coding consistent with this disclosure.

FIG. 5 is a flow diagram illustrating a scanning and entropy coding technique useful in the context of sub-band coding consistent with this disclosure. FIG. 5 demonstrates scanning and entropy coding for the perspective of the encoding process, but could also be applied to the decoding process. For encoding, the scanning changes a two-dimensional block of data corresponding to each sub-band into a one-dimensional vector, and entropy coding follows the scanning. For decoding, the scanning changes the received one-dimensional vectors corresponding to each sub-band back into the two-dimensional blocks. Given the reciprocal nature of the encoding and decoding, FIG. 5 only presents the scanning and entropy coding from the perspective of the encoder. In the decoder, the same decisions may be executed, but the entropy coding (in this case decoding) precedes the scanning. Moreover, on the decoding side, the scanning may be inverse scanning that creates two-dimensional blocks from one-dimensional vectors.

As shown in FIG. 5, scanning unit 60 performs different scanning for different sub-bands. For the LL sub-band ("Yes" 120), scanning unit 60 uses an LL scanning pattern in order to scan a two-dimensional block of data corresponding to the LL sub-band into a one-dimensional vector (122). Entropy coding unit 62 then entropy codes the one-dimensional vector corresponding to the scanned LL sub-band (124). For the LH sub-band ("Yes" 130), scanning unit 60 uses an LH scanning pattern in order to scan a two-dimensional block of data corresponding to the LH sub-band into a one-dimensional vector (132). Entropy coding unit 62 then entropy codes the one-dimensional vector corresponding to the scanned LH sub-band (134).

For the HL sub-band ("Yes" 140), scanning unit 60 uses an HL scanning pattern in order to scan a two-dimensional block of data corresponding to the HL sub-band into a one-dimensional vector (142). Entropy coding unit 62 then entropy codes the one-dimensional vector corresponding to the scanned HL sub-band (144). For the HH sub-band ("Yes" 150), scanning unit 60 uses an HH scanning pattern in order to scan a two-dimensional block of data corresponding to the HH sub-band into a one-dimensional vector (152). Entropy coding unit 62 then entropy codes the one-dimensional vector corresponding to the scanned HH sub-band (154). Again, the use of different scanning orders for the LL, LH, HL and HH sub-bands can improve the level of compression that may be achieved by entropy coding.

FIGS. 6A-6D illustrate exemplary scanning orders for different sub-bands. In particular, FIGS. 6A-6D illustrate two-dimensional blocks of data in the sub-band domain, with numbered coefficients corresponding to the order in which the data in two-dimensions is scanned into one-dimensional vectors. For the LL band (shown in FIG. 6A), the scanning order may be similar to zig-zag scanning in which the scan begins in the upper-left corner and proceeds to the lower-right corner. This is because the LL band may have its high energy coefficients typically located in the upper-left corner of the two-dimensional block, and low-energy coefficients in the lower-right corner. For the LH band (shown in FIG. 6B), the scanning order may be similar to zig-zag scanning, but may begin in the upper-right corner and scan towards the lower-left corner. This is because the LH band may have its high energy coefficients typically located in the upper-right corner of the two-dimensional block, and low-energy coefficients in the lower-left corner.

For the HL band (shown in FIG. 6C), the scanning order may be similar to zig-zag scanning, but may begin in the lower-left corner and scan towards the upper-right corner. This is because the LH band may have its high energy coefficients typically located in the lower-left corner of the two-dimensional block, and low-energy coefficients in the upper-right corner. For the HH band (shown in FIG. 6D), the scanning order may be similar to zig-zag scanning, but may begin in the lower-right corner and scan towards the upper-left corner. This is because the LH band may have its high energy coefficients typically located in the lower-right corner of the two-dimensional block, and low-energy coefficients in the upper-left corner.

The actual scan orders, as shown in the examples of FIGS. 6A-6D may vary slightly from purely zig-zag orders. Moreover, in some cases, these defined scan orders may adapt over time, based on the statistics associated with previously coded sub-bands. In this way, the scanning may adapt to better reflect the likely locations of low energy and high energy coefficients. By grouping high energy coefficients near the beginning of a scanned one-dimensional vector, and grouping the low energy coefficients near the end of a scanned one-dimensional vector, subsequent entropy coding may achieve improved compression. In particular, grouping of low energy coefficients typically results in larger "runs" of zero value coefficients, which can be easily compressed via entropy coding.

Figure 7:
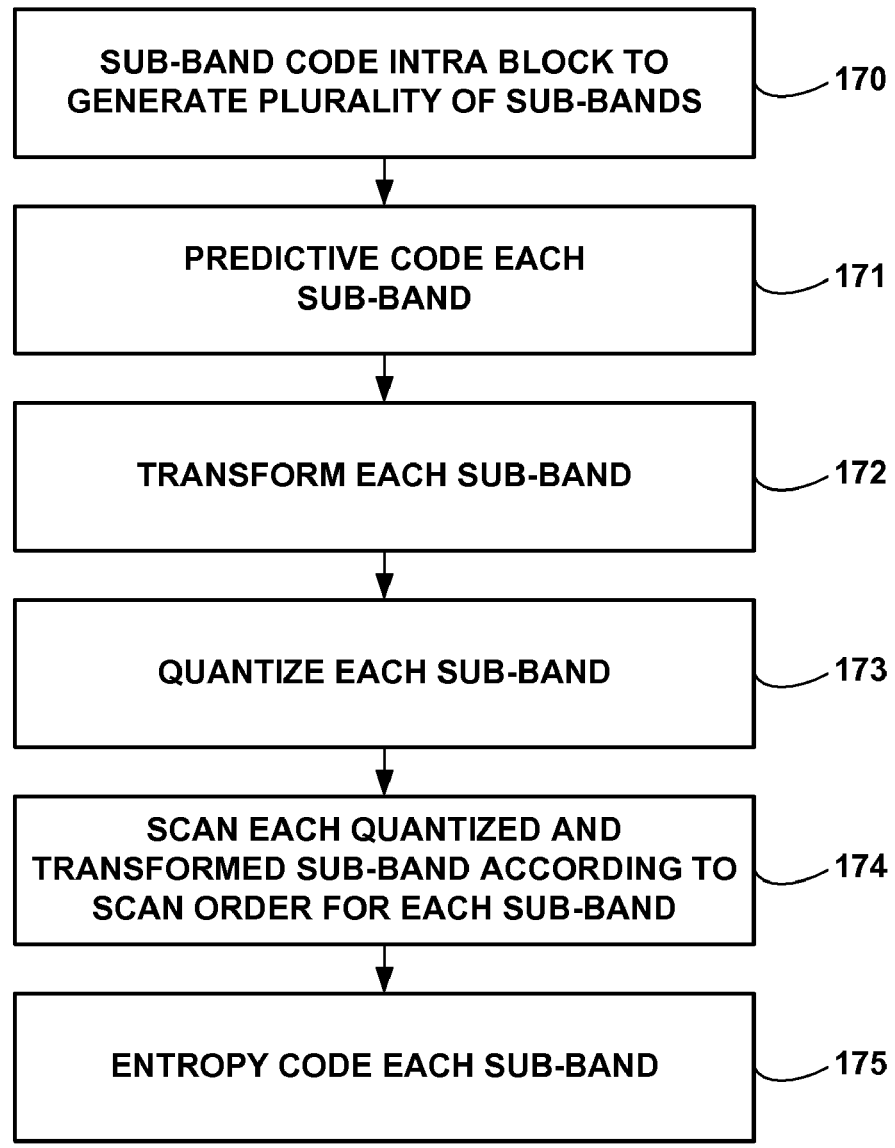
FIGS. 7-12 are flow diagrams illustrating various coding techniques consistent with this disclosure.
Figure 8:
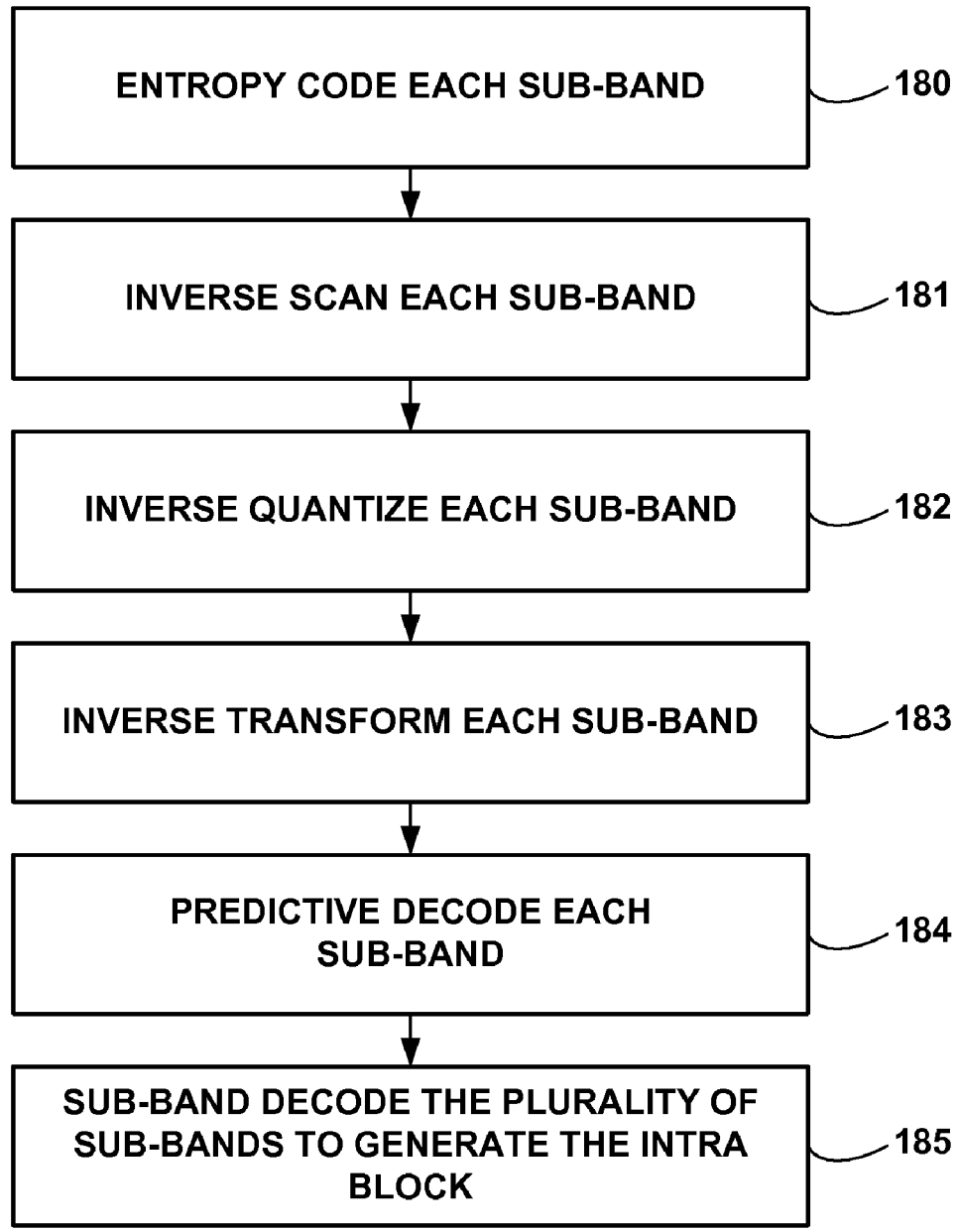

FIG. 7 is a flow diagram illustrating a coding process according to this disclosure, which may be particularly useful for intra coding. FIG. 8 is a flow diagram showing the corresponding decoding process. The process of FIG. 7 may be performed by encoder 50 for the encoding of an intra block, and the process of FIG. 8 may be performed by decoder 100 for decoding the intra block. The process of FIG. 7 is described below from the perspective of encoder 50, and the process of FIG. 8 is described from the perspective of decoder 100.

For the encoding process, sub-band coding unit 52 of video encoder 50 sub-band codes an intra block to generate a plurality of sub-bands (170). The sub-bands may correspond to an LL sub-band, an LH sub-band, an HL sub-band, and an HH sub-band. Predictive coding unit 54 predictively encodes each of the sub-bands using prediction techniques (171). For example, predictive coding unit 54 may apply techniques similar to H.264 intra coding, but may apply such techniques in the sub-band domain. Transform unit 58 transforms the quantized sub-bands (172), e.g., according to discrete cosine transform (DCT) or a conceptually similar process like the transforms defined in H.264. Quantization unit 56 then quantizes the sub-bands (173). During transform and quantization, e.g., following the predictive coding, the sub-bands may be represented by residual blocks of data. Following transform, the sub-bands may be represented by transform coefficients that define the residual blocks in the frequency domain.

Next, scanning unit 60 scans each quantized and transformed sub-band according to the scan order defined for each sub-band (174). Entropy coding unit 62 then entropy codes each scanned sub-band (175). For example, entropy coding unit 62 may apply CAVLC techniques, CABAC techniques, or other entropy coding techniques to entropy coded each scanned sub-band.

For the decoding process, entropy decoding unit 102 of video decoder 100 entropy decodes each sub-band (180) to generate one-dimensional sets of transform coefficients. Inverse scanning unit 104 inverse scans each sub-band according to the scan order for that sub-band (181) to generate two-dimensional blocks corresponding to the sub-bands. Inverse quantization unit 108 inverse quantizes the sub-bands (182), and inverse transform unit 106 inverse transforms each sub-band (183). Predictive decoding unit 110 predictively decodes the sub-bands (184), e.g., by applying H.264-like intra decoding techniques in the sub-band domain. Sub-band decoding unit 112 then decodes the sub-bands (185) to combine the data of the different sub-bands and thereby generate the decoded intra block. Prediction of sub-bands and sub-band decoding may generally occur in parallel.

As mentioned above, in some cases, it may be undesirable to apply the transform (e.g., the DCT or DCT-like transform and inverse transform steps of 172 (FIG. 7) or 183 (FIG. 8)) with respect to the HH sub-band. In such cases, transforms on the HH sub-band may be ineffective for compression. Accordingly, in such cases, the transform step is eliminated for the HH sub-band.

Figure 9:
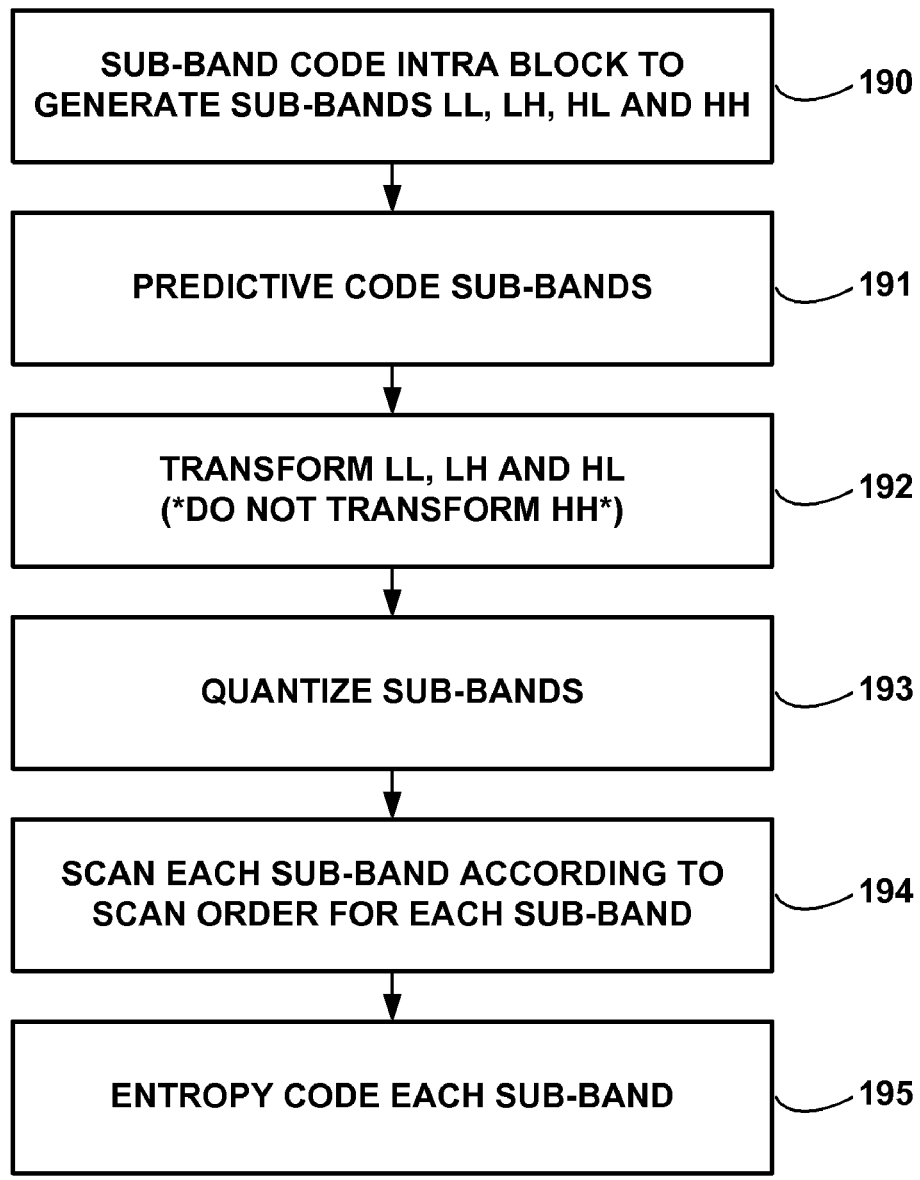
Figure 10:
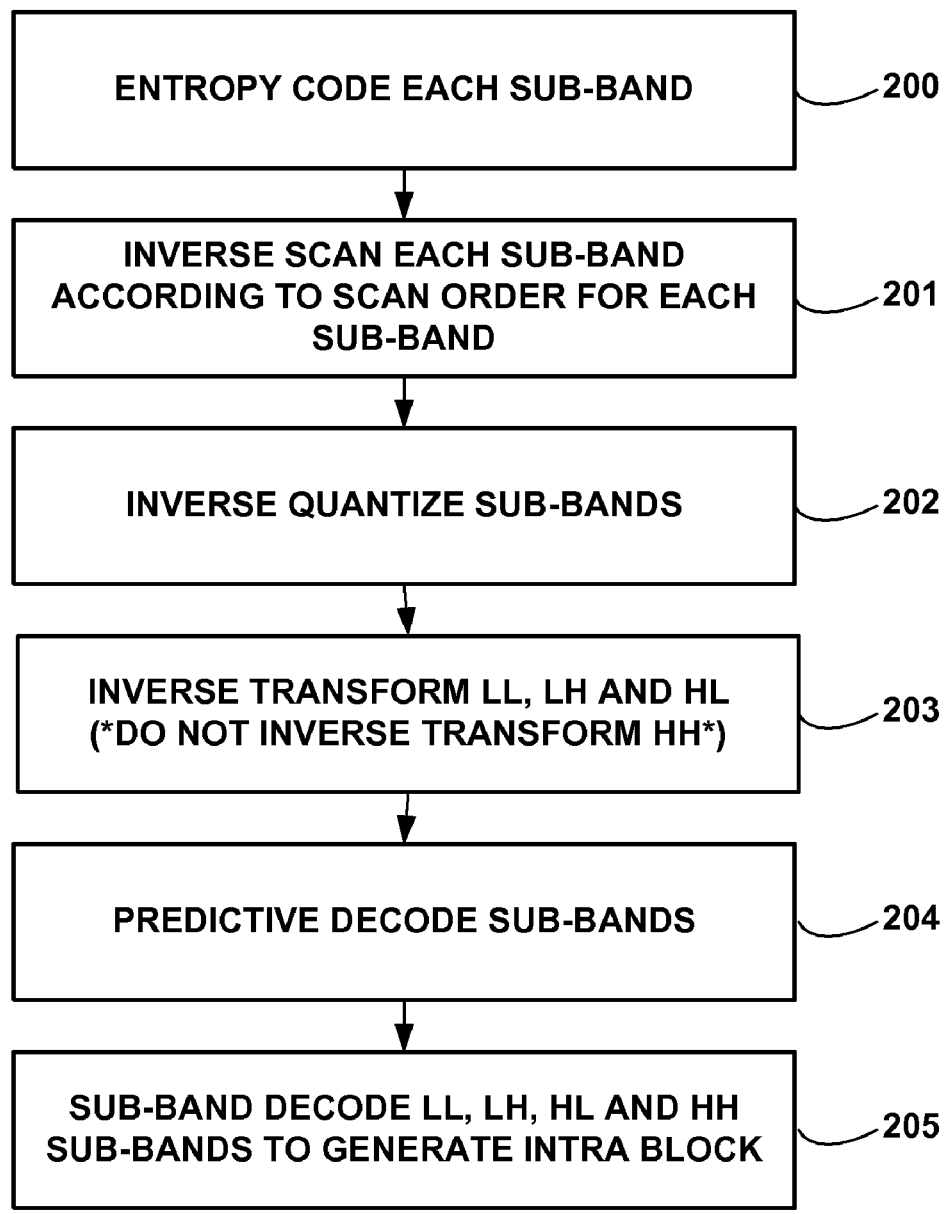

FIGS. 9 and 10 are flow diagrams illustrating encoding and decoding processes according to this disclosure, which may be useful for intra coding. In FIGS. 9 and 10, the HH sub-band is not transformed. For the encoding process, sub-band coding unit 52 of video encoder 50 sub-band codes an intra block to generate sub-bands LL, LH, HL and HH (190). Predictive coding unit 54 predictively encodes each of the sub-bands using prediction techniques (191). Predictive coding unit 54 may apply techniques similar to H.264 intra coding, but may apply such techniques in the sub-band domain. Next, transform unit 58 transforms the LL, LH and HL bands, but does not transform the HH band (192). Quantization unit 56 then quantizes the sub-bands (193). Scanning unit 60 scans each sub-band according to the scan order defined for each sub-band (194). Entropy coding unit 62 then entropy codes each scanned sub-band (195).

For the decoding process, entropy decoding unit 102 of video decoder 100 entropy codes each sub-band (200) to generate one-dimensional sets of coefficients. Inverse scanning unit 104 inverse scans each sub-band according to the scan order for that sub-band (201) to generate two-dimensional blocks corresponding to the sub-bands. Inverse quantization unit 108 inverse quantizes the sub-bands (202). Inverse transform unit 106 then inverse transforms sub-bands LL, LH and HL, but does not inverse transform the HH sub-band (203). Predictive decoding unit 110 predictively decodes the sub-bands (204), and sub-band decoding unit 112 then decodes the LL, LH, HL and HH sub-bands (205) to combine the data of the different sub-bands and thereby generate the decoded intra block.

Figure 11:
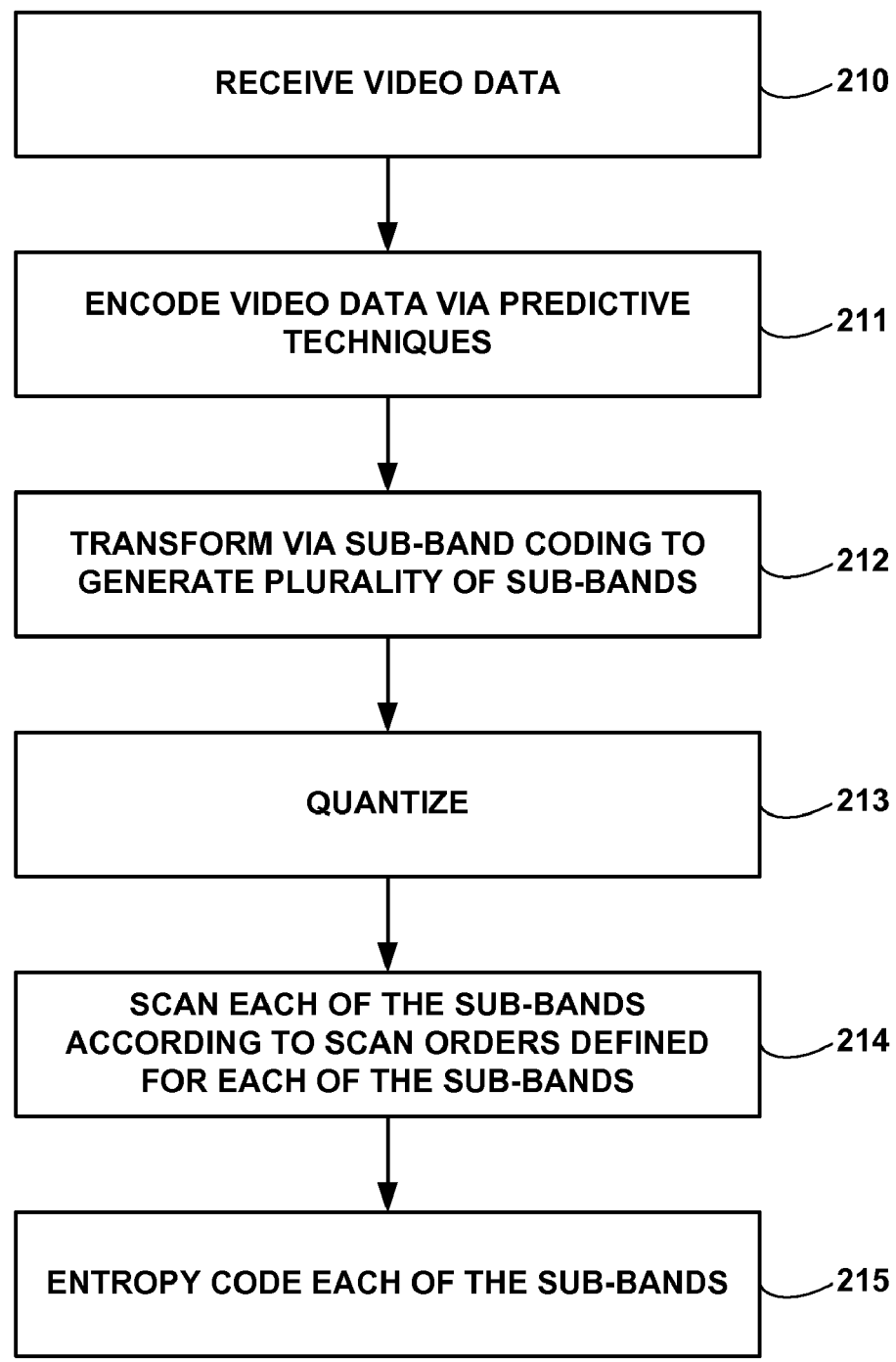
Figure 12:
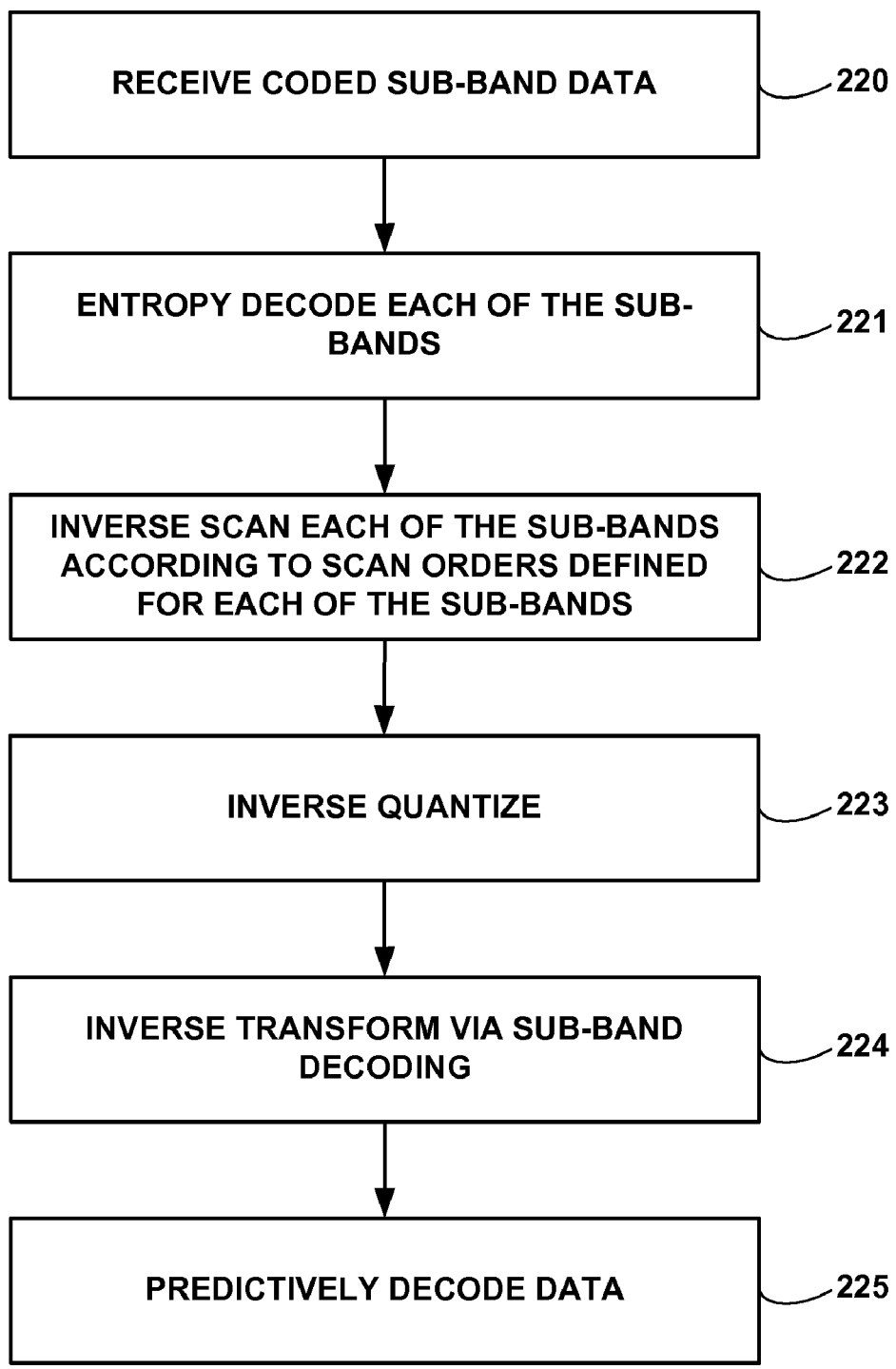

FIGS. 11 and 12 illustrate an alternative type of encoding and decoding that may use the scanning techniques of this disclosure. The techniques of FIGS. 11 and 12 do not use sub-band coding as the initial encoding step and the final decoding step, as described above. Rather, in FIGS. 11 and 12, a more conventional predictive coding methodology is used in the pixel domain, and sub-band coding use performed as a transform process that replaces conventional DCT coding. In this type of scenario, the scanning techniques of this disclosure, which involve the use of different scanning orders for different sub-bands, may still be implemented to improve entropy coding.

FIGS. 11 and 12 will be described from the perspective of video encoder 22 and video decoder 28 of FIG. 1. As shown in FIG. 11, video encoder 22 receives video data (210), e.g., comprising a video block to be coded. Video encoder 22 encodes the video data using predictive techniques in the pixel domain (211). Video encoder 22 transforms the video data via sub-band coding to generate a plurality of sub-bands (212), and quantizes the video data (213). In accordance with this disclosure, video encoder 22 scans each of the sub-bands according to scan orders defined for each of the sub-bands (214). Again, this means that each of the sub-bands has its own scan order, which may be fixed or adaptive. Once scanned, video encoder 22 then entropy codes each of the sub-bands (215). By defining different scan orders for the different sub-bands, entropy coding can be made more effective in achieving compression.

As shown in FIG. 12, video decoder 28 receives encoded sub-band data (220), e.g., comprising a coded video block. Video decoder 28 entropy decodes each of the sub-bands (221). Then, video decoder 28 inverse scans each of the sub-bands according to scan orders defined for each of the sub-bands (222). Video decoder 28 inverse quantizes the data (223), and inverse transforms the data via sub-band decoding (224). In this case, video decoder 28 predictively decodes the data in the pixel domain (225). Again, the techniques of FIGS. 11 and 12 are alternative coding techniques relative to those described above in which sub-band coding is used as an alternative to DCT coding. In this case, similar to the intra coding methodologies addressed above, it may be desirable to define different scan orders for different sub-bands in order to improve entropy coding.

The techniques of this disclosure may be realized in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed in a video coding device, causes the device to perform one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of encoding video data of a video sequence, the method comprising:
   sub-band encoding the video data to generate a plurality of sub-bands;
   scanning each of the sub-bands from two-dimensional blocks into one-dimensional vectors based on scan orders defined for each of the sub-bands;
   entropy encoding each of the scanned sub-bands;
   prior to scanning and entropy encoding each of the sub-bands:
   predictively encoding each of the sub-bands,
   transforming each of the predictively encoded sub-bands; and
   quantizing each of the transformed and predictively encoded the sub-bands.

2. The method of claim 1, wherein sub-band encoding the video data comprises filtering and downsampling the video data to generate the plurality of sub-bands.

3. The method of claim 1, wherein sub-band encoding the video data comprises generating a low-low (LL) sub-band, generating a low-high (LH) sub-band, generating a high-low (HL) sub-band, and generating a high-high (HH) sub-band.

4. The method of claim 1, wherein the video data comprises a video block, wherein the plurality of sub-bands comprises a set of sub-bands that collectively represent the video block.

5. The method of claim 4, wherein the method corresponds to an intra coding mode for intra encoding the video block.

6. The method of claim 5, wherein sub-band encoding the video data comprises generating a low-low (LL) sub-band, generating a low-high (LH) sub-band, generating a high-low (HL) sub-band, and generating a high-high (HH) sub-band, and wherein the LL sub-band forms at least part of a base layer and one or more of the LH sub-band the HL sub-band and the HH sub-band form at least part of one or more enhancement layers.

7. A method of encoding video data of a video sequence, the method comprising:
   sub-band encoding the video data to generate a plurality of sub-bands;
   scanning each of the sub-bands from two-dimensional blocks into one-dimensional vectors based on scan orders defined for each of the sub-bands;
   entropy encoding each of the scanned sub-bands;
   prior to scanning and entropy encoding each of the sub-bands:
   predictively encoding each of the sub-bands,
   transforming a subset of the predictively encoded sub-bands, and
   quantizing each of the sub-bands, wherein the video data comprises a video block, wherein the plurality of sub-bands comprises a set of sub-bands that collectively represent the video block.

8. The method of claim 7, wherein sub-band encoding the video data comprises generating a low-low (LL) sub-band, generating a low-high (LH) sub-band, generating a high-low (HL) sub-band, and generating a high-high (HH) sub-band, and wherein transforming the subset comprises transforming the LL sub-band, the LH sub-band and the LL sub-band, wherein the HH sub-band remains untransformed during the entropy coding.

9. A method of decoding video data of a video sequence, the method comprising:
   entropy decoding each of a plurality of sub-bands that correspond to the video data;
   scanning each of the sub-bands from one-dimensional vectors to two-dimensional blocks based on scan orders defined for each of the sub bands;
   sub-band decoding the plurality of sub-bands to generate the video data
   prior to sub-band decoding the plurality of sub-bands:
   inverse quantizing each of the sub-bands;

inverse transforming a subset of the sub-bands; and
predictively decoding each of the sub-bands.

10. The method of claim 9, wherein sub-band decoding the plurality of sub-bands comprises combining the plurality of sub-bands to generate a video block corresponding to the video data.

11. The method of claim 9, wherein the plurality of sub-bands include a low-low (LL) sub-band, a low-high (LH) sub-band, a high-low (HL) sub-band, and a high-high (HH) sub-band.

12. The method of claim 9, wherein the video data comprises a video block, wherein the plurality of sub-bands comprises a set of sub-bands that collectively represent the video block.

13. The method of claim 12, wherein the method corresponds to an intra coding mode for intra decoding the video block.

14. The method of claim 13, wherein the plurality of sub-bands include a low-low (LL) sub-band, a low-high (LH) sub-band, a high-low (HL) sub-band, and a high-high (HH) sub-band, and wherein the LL sub-band forms at least part of a base layer and one or more of the LH sub-band the HL sub-band and the HH sub-band form at least part of one or more enhancement layers.

15. A method of decoding video data of a video sequence, the method comprising:
    entropy decoding each of a plurality of sub-bands that correspond to the video data;
    scanning each of the sub-bands from one-dimensional vectors to two-dimensional blocks based on scan orders defined for each of the sub bands;
    sub-band decoding the plurality of sub-bands to generate the video data;
    prior to sub-band decoding the plurality of sub-bands:
    inverse quantizing each of the sub-bands;
    inverse transforming a subset of the sub-bands; and
    predictively decoding each of the sub-bands, wherein the video data comprises a video block, wherein the plurality of sub-bands comprises a set of sub-bands that collectively represent the video block.

16. The method of claim 15, wherein the plurality of sub-bands include a low-low (LL) sub-band, a low-high (LH) sub-band, a high-low (HL) sub-band, and a high-high (HH) sub-band, and wherein inverse transforming the subset comprises inverse transforming the LL sub-band, the LH sub-band and the LL sub-band, wherein the HH sub-band is untransformed.

17. An apparatus that encodes video data of a video sequence, the apparatus comprising:
    a sub-band coding unit that encodes the video data to generate a plurality of sub bands;
    a scanning unit that scans each of the sub-bands from two-dimensional blocks into one-dimensional vectors based on scan orders defined for each of the sub-bands;
    an entropy coding unit that entropy encodes each of the scanned sub-bands;
    a predictive coding unit that predictively encodes each of the sub-bands,
    a transform unit that transforms each of the predictively encoded sub-bands prior to the scanning unit scanning each of the sub-bands; and
    a quantization unit that quantizes each of the sub-bands prior to the scanning unit scanning each of the sub-bands.

18. The apparatus of claim 17, wherein the sub-band coding unit filters and downsamples the video data to generate the plurality of sub-bands.

19. The apparatus of claim 17, wherein the sub-band coding unit generates a low-low (LL) sub-band, generates a low-high (LH) sub-band, generates a high-low (HL) sub-band, and generates a high-high (HH) sub-band.

20. The apparatus of claim 17, wherein the video data comprises a video block, wherein the plurality of sub-bands comprises a set of sub-bands that collectively represent the video block.

21. The apparatus of claim 20, wherein the apparatus executes an intra coding mode for intra encoding the video block.

22. The apparatus of claim 21 wherein the sub-band coding unit generates a low-low (LL) sub-band, generates a low-high (LH) sub-band, generates a high-low (HL) sub-band, and generates a high-high (HH) sub-band, and wherein the LL sub-band forms at least part of a base layer and one or more of the LH sub-band the HL sub-band and the HH sub-band form at least part of one or more enhancement layers.

23. The apparatus of claim 17, wherein the apparatus comprises an integrated circuit.

24. The apparatus of claim 17, wherein the apparatus comprises a microprocessor.

25. An apparatus that encodes video data of a video sequence, the apparatus comprising:
    a sub-band coding unit that encodes the video data to generate a plurality of sub-bands;
    a scanning unit that scans each of the sub-bands from two-dimensional blocks into one-dimensional vectors based on scan orders defined for each of the sub-bands;
    an entropy coding unit that entropy encodes each of the scanned sub-bands;
    a predictive coding unit that predictively encodes each of the sub-bands,
    a transform unit that transforms a subset of the predictively encoded sub-bands prior to the scanning unit scanning each of the sub-bands; and
    a quantization unit that quantizes each of the sub-bands prior to the scanning unit scanning each of the sub-bands, wherein the video data comprises a video block, wherein the plurality of sub-bands comprises a set of sub-bands that collectively represent the video block.

26. The apparatus of claim 25, wherein the sub-band coding unit generates a low-low (LL) sub-band, generates a low-high (LH) sub-band, generates a high-low (HL) sub-band, and generates a high-high (HH) sub-band, and wherein the transform unit transforms the LL sub-band, the LH sub-band and the LL sub-band, wherein the HH sub-band remains untransformed during the entropy encoding by the entropy coding unit.

27. An apparatus that decodes video data of a video sequence, the apparatus comprising:
    an entropy coding unit that entropy decodes each of a plurality of sub-bands that correspond to the video data;
    a scanning unit that scans each of the sub-bands from one-dimensional vectors to two-dimensional blocks based on scan orders defined for each of the sub bands;
    a sub-band coding unit that sub-band decodes the plurality of sub-bands to generate the video data;
    an inverse quantization unit that inverse quantizes each of the sub-bands;
    an inverse transform unit that inverse transforms each of the sub-bands; and
    a predictive coding unit that predictively decodes each of the sub-bands prior to the sub-band coding unit decoding the plurality of sub-bands.

28. The apparatus of claim 27, wherein the sub-band coding unit combines the plurality of sub-bands to generate a video block corresponding to the video data.

29. The apparatus of claim 27, wherein the plurality of sub-bands include a low-low (LL) sub-band, a low-high (LH) sub-band, a high-low (HL) sub-band, and a high-high (HH) sub-band.

30. The apparatus of claim 27, wherein the video data comprises a video block, wherein the plurality of sub-bands comprises a set of sub-bands that collectively represent the video block.

31. The apparatus of claim 30, wherein the apparatus executes an intra coding mode for intra decoding the video block.

32. The apparatus of claim 31, wherein the plurality of sub-bands include a low-low (LL) sub-band, a low-high (LH) sub-band, a high-low (HL) sub-band, and a high-high (HH) sub-band, and wherein the LL sub-band forms at least part of a base layer and one or more of the LH sub-band the HL sub-band and the HH sub-band form at least part of one or more enhancement layers.

33. The apparatus of claim 27, wherein the apparatus comprises an integrated circuit.

34. The apparatus of claim 27, wherein the apparatus comprises an integrated circuit.

35. An apparatus that decodes video data of a video sequence, the apparatus comprising:
an entropy coding unit that entropy decodes each of a plurality of sub-bands that correspond to the video data;
a scanning unit that scans each of the sub-bands from one-dimensional vectors to two-dimensional blocks based on scan orders defined for each of the sub-bands;
a sub-band coding unit that sub-band decodes the plurality of sub-bands to generate the video data;
an inverse quantization unit that inverse quantizes each of the sub-bands;
an inverse transform unit that inverse transform a subset of the sub-bands; and
a predictive coding unit that predictively decodes each of the sub-bands prior to the sub-band coding unit decoding the plurality of sub-bands, wherein the video data comprises a video block, wherein the plurality of sub-bands comprises a set of sub-bands that collectively represent the video block.

36. The apparatus of claim 35, wherein the plurality of sub-bands include a low-low (LL) sub-band, a low-high (LH) sub-band, a high-low (HL) sub-band, and a high-high (HH) sub-band, and wherein the inverse transform unit inverse transforms the LL sub-band, the LH sub-band and the LL sub-band, wherein the HH sub-band is untransformed.

37. A computer-readable medium comprising instructions that upon execution in a video coding device cause the device to encode video data of a video sequence, wherein the instructions cause the device to:
sub-band encode the video data to generate a plurality of sub-bands;
scan each of the sub-bands from two-dimensional blocks into one-dimensional vectors based on scan orders defined for each of the sub-bands;
entropy encode each of the scanned sub-bands;
prior to scanning and entropy encoding each of the sub-bands:
predictively encode each of the sub-bands,
transform each of the predictively encoded sub-bands, and
quantize each of the predictively encoded sub-bands.

38. The computer-readable medium of claim 37, wherein the instructions cause the device to sub-band encode by filtering and downsampling the video data to generate the plurality of sub-bands.

39. The computer-readable medium of claim 37, wherein sub-band encoding the video data comprises generating a low-low (LL) sub-band, generating a low-high (LH) sub-band, generating a high-low (HL) sub-band, and generating a high-high (HH) sub-band.

40. The computer-readable medium of claim 37, wherein the video data comprises a video block, wherein the plurality of sub-bands comprises a set of sub-bands that collectively represent the video block.

41. The computer-readable medium of claim 40, wherein upon execution, the instructions cause the device to execute an intra coding mode for intra encoding the video block.

42. The computer-readable medium of claim 41, wherein sub-band encoding the video data comprises generating a low-low (LL) sub-band, generating a low-high (LH) sub-band, generating a high-low (HL) sub-band, and generating a high-high (HH) sub-band, and wherein the LL sub-band forms at least part of a base layer and one or more of the LH sub-band the HL sub-band and the HH sub-band form at least part of one or more enhancement layers.

43. A computer-readable medium comprising instructions that upon execution in a video coding device cause the device to encode video data of a video sequence, wherein the instructions cause the device to:
sub-band encode the video data to generate a plurality of sub-bands;
scan each of the sub-bands from two-dimensional blocks into one-dimensional vectors based on scan orders defined for each of the sub-bands
entropy encode each of the scanned sub-bands;
prior to scanning and entropy encoding each of the sub-bands:
predictively encode each of the sub-bands,
transform a subset of the predictively encoded sub-bands, and
quantize each of predictively encoded the sub-bands, wherein the video data comprises a video block, wherein the plurality of sub-bands comprises a set of sub-bands that collectively represent the video block.

44. The computer-readable medium of claim 43, wherein sub-band encoding the video data comprises generating a low-low (LL) sub-band, generating a low-high (LH) sub-band, generating a high-low (HL) sub-band, and generating a high-high (HH) sub-band, and wherein transforming the subset comprises transforming the LL sub-band, the LH sub-band and the LL sub-band, wherein the HH sub-band remains untransformed during the entropy coding.

45. A computer-readable medium comprising instructions that upon execution in a video coding device cause the device to decode video data of a video sequence, wherein the instructions cause the device to:
entropy decode each of a plurality of sub-bands that correspond to the video data;
scan each of the sub-bands from one-dimensional vectors to two-dimensional blocks based on scan orders defined for each of the sub bands;
sub-band decode the plurality of sub-bands to generate the video data;
prior to sub-band decoding the plurality of sub-bands:
inverse quantize each of the sub-bands;
inverse transform each of the sub-bands; and
predictively decode each of the sub-bands.

46. The computer-readable medium of claim 45, wherein sub-band decoding the plurality of sub-bands comprises combining the plurality of sub-bands to generate a video block corresponding to the video data.

47. The computer-readable medium of claim 45, wherein the plurality of sub-bands include a low-low (LL) sub-band, a low-high (LH) sub-band, a high-low (HL) sub-band, and a high-high (HH) sub-band.

48. The computer-readable medium of claim 45, wherein the video data comprises a video block, wherein the plurality of sub-bands comprises a set of sub-bands that collectively represent the video block.

49. The computer-readable medium of claim 48, wherein the method corresponds to an intra coding mode for intra decoding the video block.

50. The computer-readable medium of claim 49, wherein the plurality of sub-bands include a low-low (LL) sub-band, a low-high (LH) sub-band, a high-low (HL) sub-band, and a high-high (HH) sub-band, and wherein the LL sub-band forms at least part of a base layer and one or more of the LH sub-band the HL sub-band and the HH sub-band form at least part of one or more enhancement layers.

51. A computer-readable medium comprising instructions that upon execution in a video coding device cause the device to decode video data of a video sequence, wherein the instructions cause the device to:
 entropy decode each of a plurality of sub-bands that correspond to the video data;
 scan each of the sub-bands from one-dimensional vectors to two-dimensional blocks based on scan orders defined for each of the sub-bands;
 sub-band decode the plurality of sub-bands to generate the video data;
 prior to sub-band decoding the plurality of sub-bands:
 inverse quantize each of the sub-bands;
 inverse transform a subset of the sub-bands; and
 predictively decode each of the sub-bands, wherein the video data comprises a video block, wherein the plurality of sub-bands comprises a set of sub-bands that collectively represent the video block.

52. The computer-readable medium of claim 51, wherein the plurality of sub-bands include a low-low (LL) sub-band, a low-high (LH) sub-band, a high-low (HL) sub-band, and a high-high (HH) sub-band, and wherein inverse transforming the subset comprises inverse transforming the LL sub-band, the LH sub-band and the LL sub-band, wherein the HH sub-band is untransformed.

53. A device that encodes video data of a video sequence, the device comprising:
 means for sub-band encoding the video data to generate a plurality of sub-bands;
 means for scanning each of the sub-bands from two-dimensional blocks into one-dimensional vectors based on scan orders defined for each of the sub-bands;
 means for entropy encoding each of the scanned sub-bands;
 means for predictively encoding each of the sub-bands,
 means for transforming each of the predictively encoded sub-bands prior to scanning and entropy encoding each of the sub-bands, and
 means for quantizing each of the predictively encoded the sub-bands prior to scanning and entropy encoding each of the sub-bands.

54. The device of claim 53, wherein means for sub-band encoding the video data comprises means for filtering and downsampling the video data to generate the plurality of sub-bands.

55. The device of claim 53, wherein means for sub-band encoding the video data comprises means for generating a low-low (LL) sub-band, means for generating a low-high (LH) sub-band, means for generating a high-low (HL) sub-band, and means for generating a high-high (HH) sub-band.

56. The device of claim 53, wherein the video data comprises a video block, wherein the plurality of sub-bands comprises a set of sub-bands that collectively represent the video block.

57. The device of claim 56, wherein the device executes an intra coding mode for intra encoding the video block.

58. The device of claim 57, wherein means for sub-band encoding the video data comprises means for generating a low-low (LL) sub-band, means for generating a low-high (LH) sub-band, means for generating a high-low (HL) sub-band, and means for generating a high-high (HH) sub-band, and wherein the LL sub-band forms at least part of a base layer and one or more of the LH sub-band the HL sub-band and the HH sub-band form at least part of one or more enhancement layers.

59. A device that encodes video data of a video sequence, the device comprising:
 means for sub-band encoding the video data to generate a plurality of sub-bands;
 means for scanning each of the sub-bands from two-dimensional blocks into one-dimensional vectors based on scan orders defined for each of the sub-bands,
 means for entropy encoding each of the scanned sub-bands,
 means for predictively encoding each of the sub-bands,
 means for transforming a subset of the predictively encoded sub-bands prior to scanning and entropy encoding each of the sub-bands, and
 means for quantizing each of predictively encoded the sub-bands prior to scanning and entropy encoding each of the sub-bands, wherein the video data comprises a video block, wherein the plurality of sub-bands comprises a set of sub-bands that collectively represent the video block.

60. The device of claim 59, wherein means for sub-band encoding the video data comprises means for generating a low-low (LL) sub-band, means for generating a low-high (LH) sub-band, means for generating a high-low (HL) sub-band, and means for generating a high-high (HH) sub-band, and wherein means for transforming the subset comprises means for transforming the LL sub-band, means for transforming the LH sub-band and means for transforming the LL sub-band, wherein the HH sub-band remains untransformed during the entropy coding.

61. A device for decoding video data of a video sequence, the device comprising:
 means for entropy decoding each of a plurality of sub-bands that correspond to the video data;
 means for scanning each of the sub-bands from one-dimensional vectors to two-dimensional blocks based on scan orders defined for each of the sub bands;
 means for sub-band decoding the plurality of sub-bands to generate the video data;
 means for inverse quantizing each of the sub-bands;
 means for inverse transforming each of the sub-bands; and
 means for predictively decoding each of the sub-bands prior to sub-band decoding the plurality of sub-bands.

62. The device of claim 61, wherein means for sub-band decoding the plurality of sub-bands comprises means for combining the plurality of sub-bands to generate a video block corresponding to the video data.

63. The device of claim 61, wherein the plurality of sub-bands include a low-low (LL) sub-band, a low-high (LH) sub-band, a high-low (HL) sub-band, and a high-high (HH) sub-band.

64. The device of claim 61, wherein the video data comprises a video block, wherein the plurality of sub-bands comprises a set of sub-bands that collectively represent the video block.

65. The device of claim 64, wherein the device executes an intra coding mode for intra decoding the video block.

66. The device of claim 65, wherein the plurality of sub-bands include a low-low (LL) sub-band, a low-high (LH) sub-band, a high-low (HL) sub-band, and a high-high (HH) sub-band, and wherein the LL sub-band forms at least part of a base layer and one or more of the LH sub-band the HL sub-band and the HH sub-band form at least part of one or more enhancement layers.

67. A device for decoding video data of a video sequence, the device comprising:

means for entropy decoding each of a plurality of sub-bands that correspond to the video data;

means for scanning each of the sub-bands from one-dimensional vectors to two-dimensional blocks based on scan orders defined for each of the sub-bands;

means for sub-band decoding the plurality of sub-bands to generate the video data means for inverse quantizing each of the sub-bands;

means for inverse transforming a subset of the sub-bands; and means for predictively decoding each of the sub-bands prior to sub-band decoding the plurality of sub-bands, wherein the video data comprises a video block, wherein the plurality of sub-bands comprises a set of sub-bands that collectively represent the video block.

68. The device of claim 67, wherein the plurality of sub-bands include a low-low (LL) sub-band, a low-high (LH) sub-band, a high-low (HL) sub-band, and a high-high (HH) sub-band, and wherein means for inverse transforming the subset comprises means for inverse transforming the LL sub-band, means for inverse transforming the LH sub-band and means for inverse transforming the LL sub-band, wherein the HH sub-band is untransformed.

* * * * *